United States Patent
Goebels et al.

(10) Patent No.: US 6,401,626 B1
(45) Date of Patent: Jun. 11, 2002

(54) CONNECTING DEVICE BETWEEN TWO VEHICLE PARTS HINGED TO ONE ANOTHER OF AN ARTICULATED VEHICLE

(75) Inventors: André Goebels, Kassel; Michael Herzfeldt, Reinhardshagen, both of (DE)

(73) Assignee: Hubner GmbH, Kassel (DE)

( * ) Notice: Subject to any disclaimer, the term of this patent is extended or adjusted under 35 U.S.C. 154(b) by 9 days.

(21) Appl. No.: 09/620,843

(22) Filed: Jul. 21, 2000

Related U.S. Application Data

(63) Continuation-in-part of application No. PCT/DE98/03219, filed on Nov. 15, 1998.

(51) Int. Cl.[7] .............................. B60D 5/00; B61D 17/22
(52) U.S. Cl. ......................................... 105/18; 105/8.1
(58) Field of Search ........................ 105/8.1, 3, 15–18

(56) References Cited

U.S. PATENT DOCUMENTS

| | | | |
|---|---|---|---|
| 2,216,547 A | 10/1940 | Christianson | |
| 2,383,372 A | 8/1945 | Dean | |
| 2,843,417 A * | 7/1958 | Wahl et al. | 105/18 |
| 4,247,128 A * | 1/1981 | Knapp et al. | 105/18 |
| 4,318,345 A * | 3/1982 | Kleim | 105/18 |
| 4,503,779 A * | 3/1985 | Chadwick | 105/18 |
| 4,903,612 A * | 2/1990 | Sassa et al. | 105/18 |

FOREIGN PATENT DOCUMENTS

| | | |
|---|---|---|
| DE | 92 15 394 | 2/1993 |
| DE | 43 29 674 | 3/1995 |
| DE | 94 20 230 | 3/1995 |

* cited by examiner

*Primary Examiner*—Joseph D. Pape
*Assistant Examiner*—Gregory Blankenship
(74) *Attorney, Agent, or Firm*—Welsh & Katz, Ltd.

(57) ABSTRACT

Connecting device (1) between two vehicle parts hinged to one another of an articulated vehicle, comprising a lower swivel joint (10) and a connection with a bellows (30) and an intercar gangway (20), whereas the swivel joint (10) is provided with two joint members (11, 12) being rotatably joined to one another by means of a rotary member (15), and whereas the bellows (30) is fastened on the joint members (11, 12).

13 Claims, 4 Drawing Sheets

CONNECTING DEVICE BETWEEN TWO VEHICLE PARTS HINGED TO ONE ANOTHER OF AN ARTICULATED VEHICLE

This application is a continuation in part of international application number PCT DE/98/03219, filed Nov. 15, 1998 (status, abandoned, pending, etc.).

BACKGROUND OF THE INVENTION

1. Field of the invention

The present invention relates to a connecting device between two vehicle parts hinged to one another of an articulated vehicle, comprising a lower swivel joint and a connection with a bellows and an intercar gangway, whereas the swivel joint is provided with two joint members being rotatably joined to one another by means of a rotary member.

2. Description of the prior art

Articulated vehicles with a connecting device of the type mentioned above are known from railway vehicles for example. Recently, so-called low-platform vehicles are being developed, that is vehicles whose entrance area in particular is only a small distance away from the surface of the platform. Such vehicles are lowered. Moreover, due to soundproofing as well as to thermal insulation, double bellows are being used with increased frequency. That means that, in the area of the connection between two vehicle parts hinged to one another of an articulated vehicle, quite a lot of space is needed in the floor area toward the ground, this space often not being available in this area due to the low height of the vehicle, yet the bellows being designed in the floor area as a single bellows only and not as a double bellows.

SUMMARY OF THE INVENTION

The object of the present invention is therefore to develop a connecting device of the type mentioned above in such a way so that even with low-platform vehicles sufficient ground clearance is given even in the area of the connection.

The solution of this object is to fasten the bellows, which is designed as a pleated or as an undulated bellows, to the joint members. According to the state of the art, the bellows has been linked so far to the front sides of the vehicle parts. In the area of the front sides of the vehicle's portal, separate suspension arrangements are provided for the reception of the bellows. These suspension arrangements also extend downward, that means toward the ground surface on which the vehicle is riding, which entails the disadvantage that the connection and thus also the bellows that bridges over the joint are located quite near to the ground, which caused the bellows to get damaged as soon as the ground was a little uneven. Thanks to the direct arrangement of the bellows on the joint members it is now possible to lead the bellows around the joint at a much smaller distance to the joint. This entails that the distance between the bellows and the ground is comparatively bigger than it is the case in the state of the art.

It has been particularly foreseen that each joint member is provided on its side facing the vehicle with an adapter plate for its connection with the vehicle part, whereas the bellows is hinged on the adapter plate. To this end, the adapter plate is advantageously fitted with a groove-like reception for the one end of the bellows, so that no separate fastening means have to be provided in order to receive the bellows in the area of the main entrance of the vehicle part, which entails the advantage of a production at lower cost. In order to arrange the bellows on the adapter plate in the groove-like reception, the bellows is fitted at its end with a swelling that is introduced into the groove-like reception. According to another feature and in order to prevent the bellows from sagging in its central part, the bellows is advantageously linked to the rotary member by connecting means. The connecting means hereby consists of two arms, each of them locking positively the bellows. The arms are hereby advantageously extending in such a manner so that the rotary member is essentially completely covered.

According to a particular embodiment, the intercar gangway with the bellows, which can be designed as a pleated or as an undulated bellows for example, is provided with two gangway parts, whereas the first of the two gangway parts may be accommodated on the one joint member in the area of the fastening on the vehicle part, whereas the other gangway part may be connected to the first gangway part in the area of the swivelling axis of the swivel joint by means of a connecting member. This clearly shows that the one gangway part is firmly connected to the one joint member, whereas the other gangway part is quite loose, that is it rests, horizontally movable, on the joint member. When threading a curve, the other joint member can thus be displaced relative to the gangway part located on top of it. In order to prevent the gangway parts from caving in in the area of the connecting member of the two gangway parts, the connecting member is borne on the rotary member in such a manner so that it may be supported.

In addition, in order to permit an easy motion of the gangway parts on the joint members, the gangway parts are provided on their underside with sliding members. In order to enable the motion of the other gangway member relative to the adjacent vehicle part when the articulated vehicle is threading a curve, this gangway member has got a semicircular shape on its side facing the vehicle.

According to a particular embodiment, the connecting device in the roof area is provided with an upper swivel joint, thanks to which the vehicles hinged to one another are prevented from buckling. That means that vehicle parts that are connected to each other in such a way are able to move horizontally relative to one another, this having to occur when threading a curve, but that a nodding movement around the horizontally running transverse axis of the vehicles is rendered impossible by such a construction. Such a construction is used in vehicles which have only little ground clearance and which accordingly have a lower swivel joint that does not have the dimensions required to avoid the nodding movement. That is why the other swivel joint is provided in the roof area.

In the following, the invention is explained in more details with the help of the drawing.

DESCRIPTION OF THE PREFERRED EMBODIMENT(S)

Figure 1:
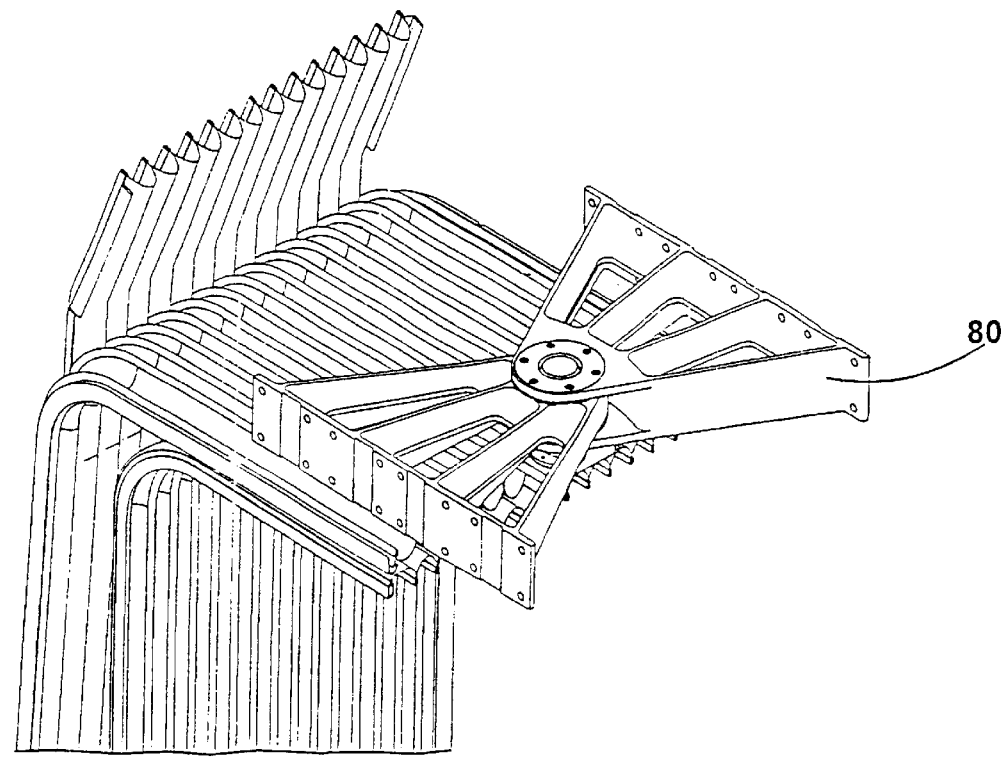
FIG. 1 is a perspective view of the connecting device.
Figure 1:
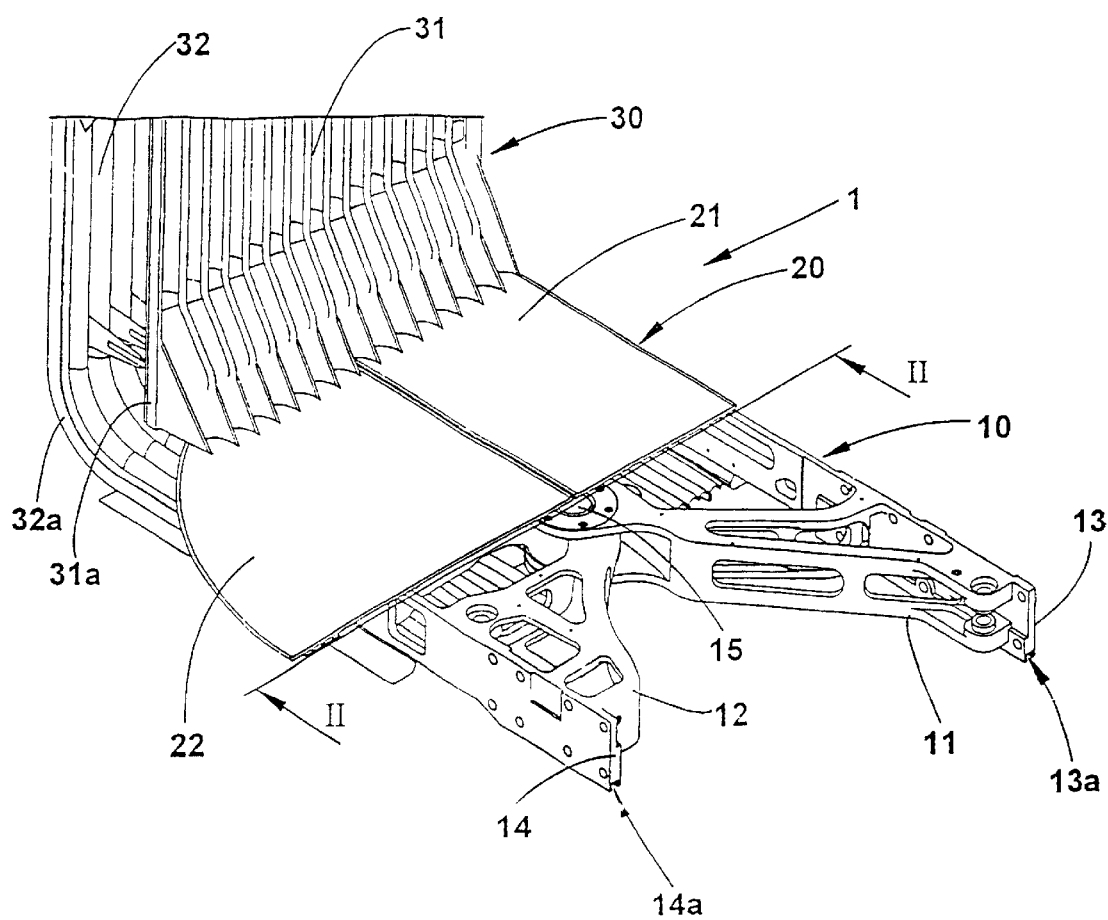
Figure 2:
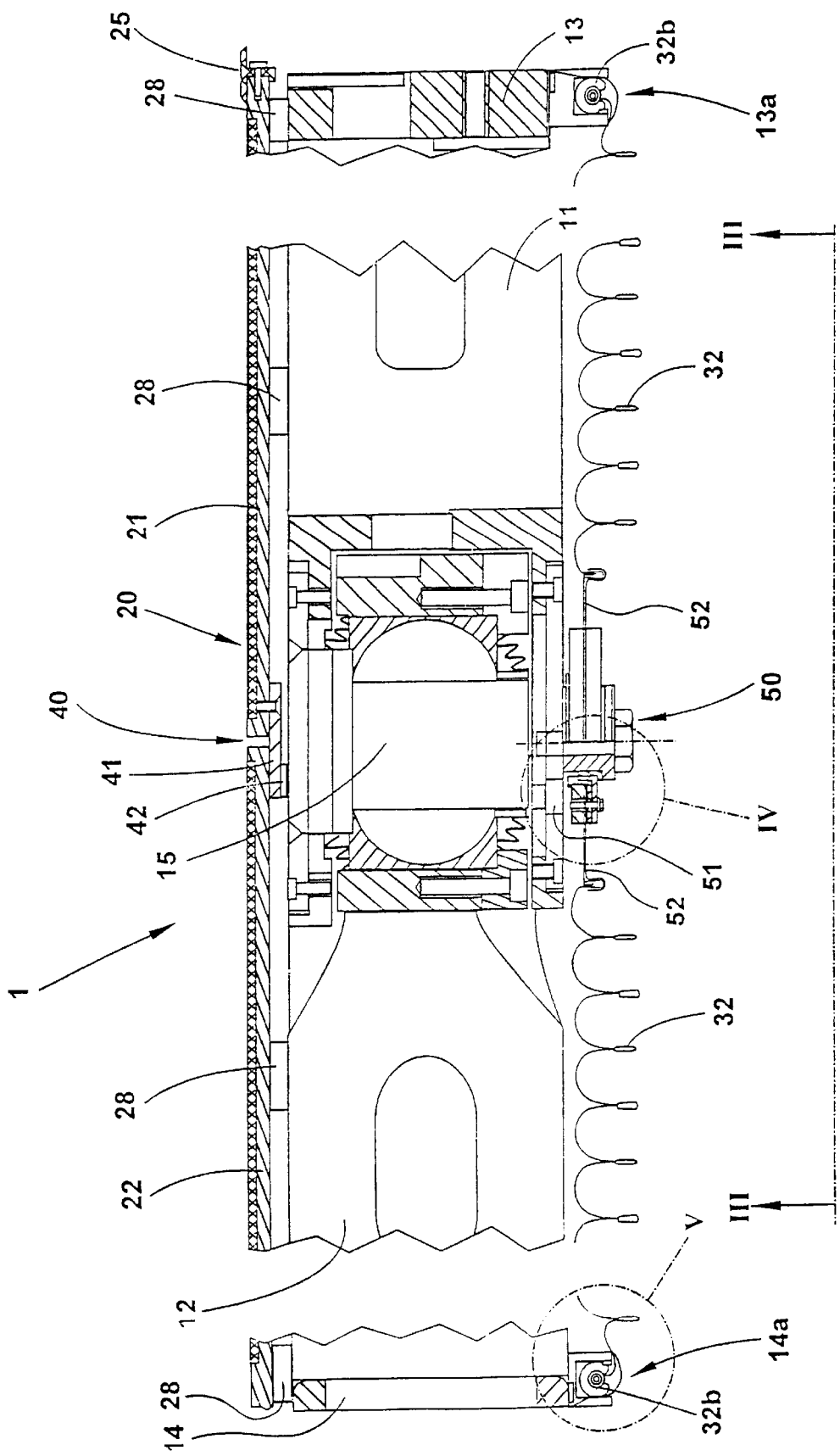
FIG. 2 is a section taken along the line II/II of FIG. 1.
Figure 3:
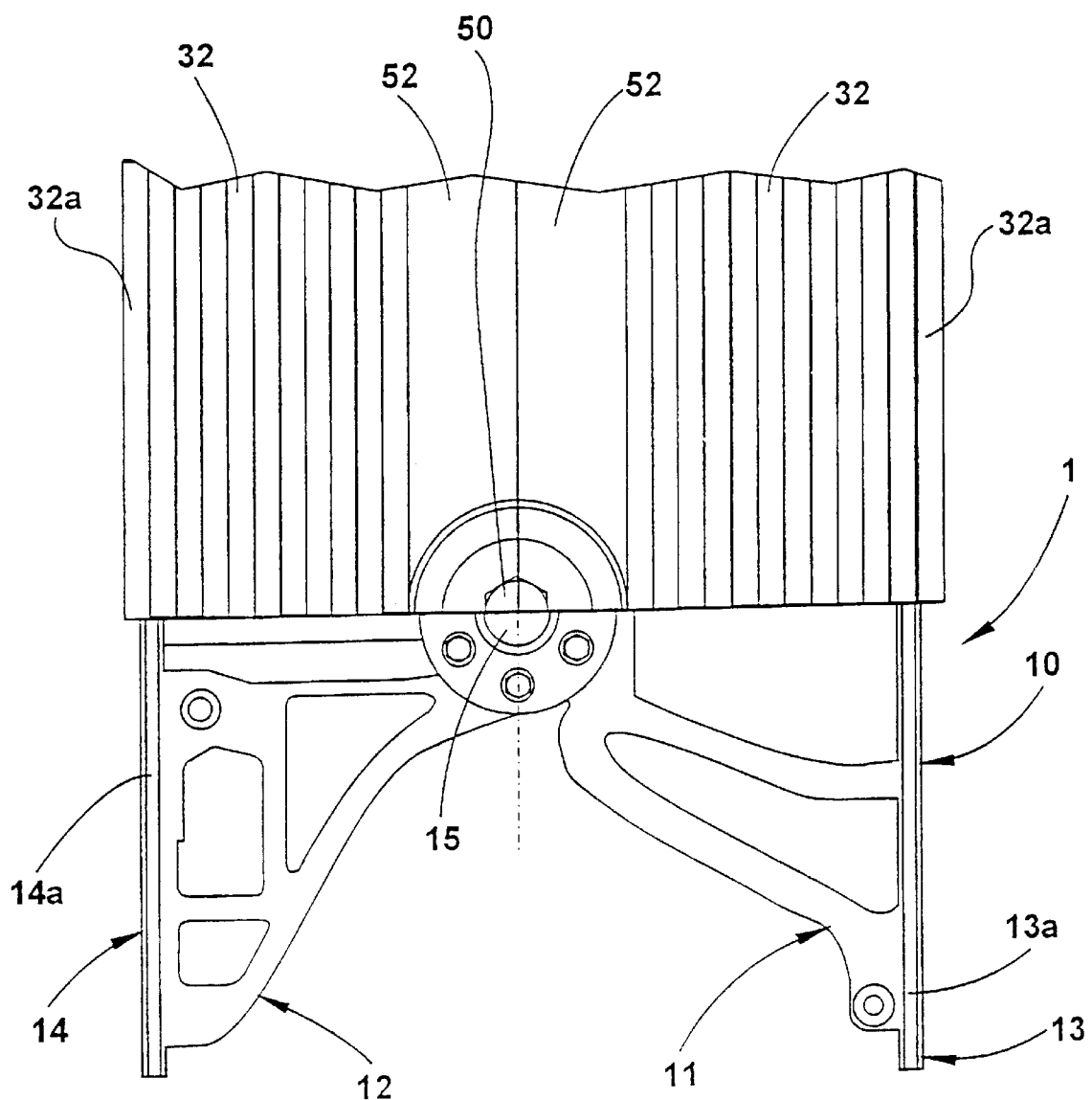
FIG. 3 is a view taken along the line III/III of FIG. 2.
Figure 4:
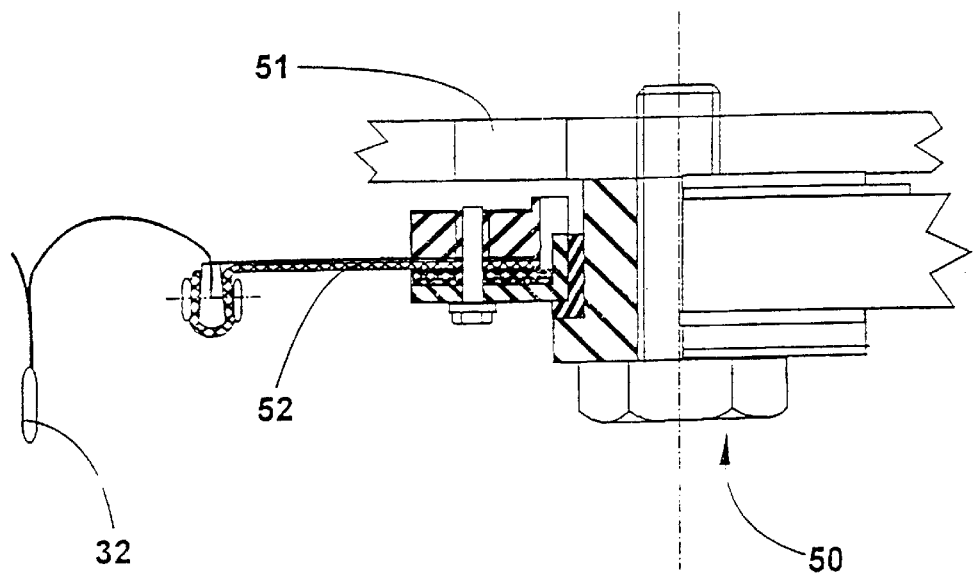
FIG. 4 and FIG. 5 are enlargements of FIG. 2.
Figure 5:
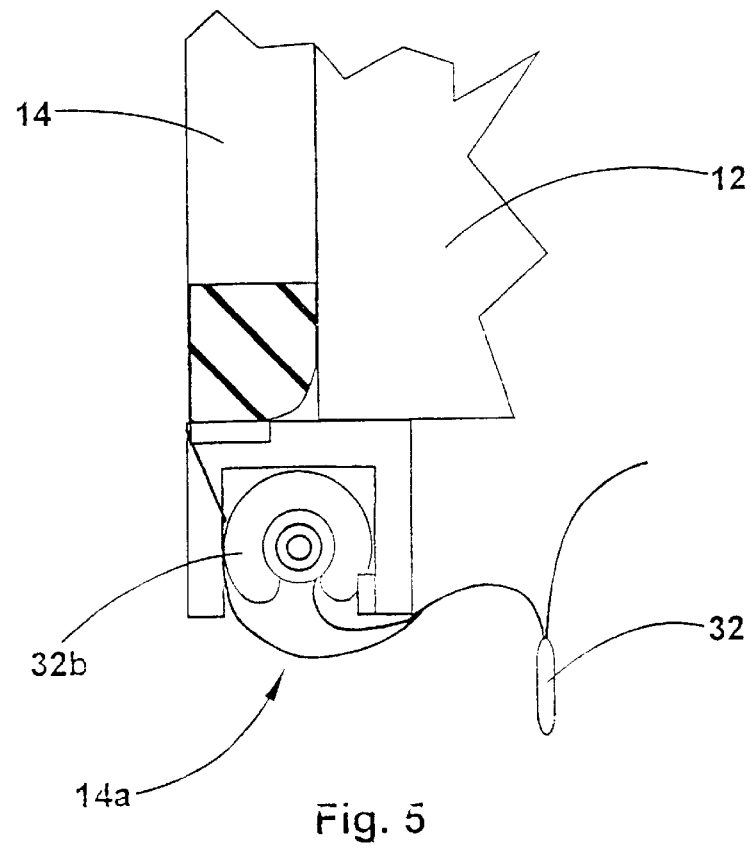

The connecting device referred to as a whole with numeral 1 shows the swivel joint referred to with numeral 10, the intercar gangway referred to with numeral 20 as well as the double undulated bellows 30. The double undulated bellows 30 consists of the inner undulated bellows 31 and of the outer undulated bellows 32. Each bellows 31, 32 has at its end a frame 31a or 32a by which it is connected to the front side of the corresponding vehicle. The outer undulated bellows 32 encompasses the swivel joint 10. This undulated bellows 32 is fastened on the swivel joint 10. In addition, an upper swivel joint 80 is provided that connects the two cars in the ceiling area of the connection. This joint helps to prevent buckling of the vehicles as already described.

The swivel joint 10 has the two joint members 11, 12, which may be rotatably connected to one another by means of a rotary member 15. Each joint member 11, 12 has at its end an adapter plate 13, 14 fitted on its underside with a groove 13a, 14a. This groove 13a, 14a serves to receive the bellows 32. To this purpose, the bellows is provided at its end with a swelling 32b by which it is received by the groove 13a, 14a.

In order to prevent the bellows 32 from sagging in the centre of the joint, the bellows is maintained on the rotary member 15 by connecting means 50. The connecting means referred to as a whole with numeral 50 comprises an axis 51 by means of which the connecting means may be connected to the rotary member 15. The axis 51 in its turn has two plate-shaped arms 52 that receive at their end the free end of the bellows 32.

The intercar gangway referred to with numeral 20 consists of the gangway parts 21 and 22. Hereby, the gangway part 21 is connected to the joint member 11 of the swivel joint 10 in the area of the adapter plate 13 at 25. The connection of this gangway part 21 with the gangway part 22 is assured by a connecting member referred to as a whole with numeral 40. This connecting member 40 has a plate 41 that is rigidly connected to the gangway part 21, but that is rotatably connected to the gangway part 22. At the same time, this plate 41 is propped on the upper side of the rotary member 15 by a sliding member 42. The gangway part 22 has got a semicircular shape, as may be seen in FIG. 1. Both the gangway part 21 and the gangway part 22 are provided on their underside with sliding members 28 that are permitting a relative motion between the different gangway members and the joint members.

We claim:

1. Connecting device (1) between two vehicle parts hinged to one another of an articulated vehicle, comprising a lower swivel joint (10) and a connection with a bellows (30) and an intercar gangway (20), whereas the swivel joint (10) is provided with two joint members (11, 12) being rotatably joined to one another by means of a rotary member (15), characterized in that the bellows (30) is fastened on the joint members (11, 12).

2. Connecting device according to claim 1, characterized in that each joint member (11, 12) is provided on its side facing the vehicle with an adapter plate (13, 14) for its connection with the vehicle part, whereas the bellows (30) is arranged on the adapter plate (13, 14).

3. Connecting device according to claim 2, characterized in that the adapter plate (13, 14) is provided with a groove-like reception (13a, 14a) for the one end of the bellows (30).

4. Connecting device according to claim 3, characterized in that the bellows (30) is fitted at its end with a swelling (32b) that is introduced into the groove-like reception (13a, 14a).

5. Connecting device according to claim 1, characterized in that the bellows (30) is linked to the rotary member (15) by connecting means (50).

6. Connecting device according to claim 5, characterized in that the connecting means (50) comprises two arms (52), by means of which the bellows (30) is positively locked.

7. Connecting device according to claim 1, characterized in that the bellows (30) is designed as a pleated or as an undulated bellows.

8. Connecting device according to claim 1, characterized in that the connecting device (1) in the a roof area is provided with an upper swivel joint (80).

9. Connecting device according to claim 1, characterized in that the intercar gangway (20) is provided with two gangway parts (21, 22), whereas a first gangway part (21) may be accommodated on the one joint member (11) in an area of the fastening on the vehicle part, whereas the other gangway part (22) may be connected to the first gangway part (21) in the area of the swivelling axis of the swivel joint (10) by means of a connecting member (40).

10. connecting device according to claim 9, characterized in that the connecting member (40) is borne on the rotary member (10) in such a manner so that it may be supported.

11. Connecting device according to claim 9, characterized in that the gangway parts (21, 22) are provided on their underside with sliding members (28).

12. Connecting device according to claim 9, characterized in that the other gangway part (22) has got a semicircular shape.

13. Connecting device according to claim 1, characterized in that the bellows (30) is designed as a double undulated bellows (31, 32).

* * * * *